(12) United States Patent
Guo et al.

(10) Patent No.: US 10,410,656 B1
(45) Date of Patent: Sep. 10, 2019

(54) DATA STORAGE DEVICE PRE-BIASING A SPIN TORQUE OSCILLATOR PRIOR TO A WRITE OPERATION

(71) Applicant: Western Digital Technologies, Inc., San Jose, CA (US)

(72) Inventors: Guoxiao Guo, Irvine, CA (US); Soo-Choon Kang, Irvine, CA (US); Hongchao T. Zhao, San Jose, CA (US); David Scott C. Amiss, San Francisco, CA (US); Duc H. Banh, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/209,564

(22) Filed: Dec. 4, 2018

(51) Int. Cl.
- *G11B 5/09* (2006.01)
- *G11B 5/012* (2006.01)
- *G11B 5/82* (2006.01)
- *G11B 5/55* (2006.01)

(52) U.S. Cl.
CPC ........... *G11B 5/012* (2013.01); *G11B 5/5582* (2013.01); *G11B 5/82* (2013.01)

(58) Field of Classification Search
None
See application file for complete search history.

(56) References Cited

U.S. PATENT DOCUMENTS

| | | | |
|---|---|---|---|
| 7,990,647 B2 | 8/2011 | Lille | |
| 8,441,909 B1 | 5/2013 | Thayamballi et al. | |
| 8,456,980 B1 | 6/2013 | Thayamballi | |
| 8,477,569 B2 | 7/2013 | Erden et al. | |
| 9,202,528 B2 | 12/2015 | Furukawa et al. | |
| 9,355,654 B1 | 5/2016 | Mallary | |
| 9,620,162 B1 | 4/2017 | Haralson | |
| 9,672,846 B1* | 6/2017 | Tanaka | G11B 5/17 |
| 2013/0279039 A1* | 10/2013 | Shiroishi | G11B 20/1217 360/48 |
| 2013/0335847 A1* | 12/2013 | Shiroishi | G11B 5/02 360/46 |
| 2015/0092292 A1* | 4/2015 | Furukawa | G11B 33/1433 360/59 |
| 2016/0111118 A1* | 4/2016 | Funayama | G11B 5/4853 360/234.3 |

OTHER PUBLICATIONS

Kun Ma, Wai Ee Wong, Jianyi Wang, Guoxiao Guo, and Youyi Wang, "Writing Process Modeling and Identification for Heat-Assisted Magnetic Recording," IEEE Transactions on Magnetics, vol. 53, No. 2, Feb. 2017.

Jianyi Wang, Kun Ma, Zhen Ye, Wai Ee Wong, Guoxiao Guo, and Youyi Wang, "HAMR Writing Process Model-Based Compensation of Laser-Induced Transients," IEEE Transactions on Magnetics, vol. 53, No. 3, Mar. 2017.

* cited by examiner

Primary Examiner — Peter Vincent Agustin

(57) ABSTRACT

A data storage device is disclosed comprising a head actuated over a disk, wherein the head comprises a spin torque oscillator (STO). A first bias signal is applied to the STO during a first interval preceding a write operation to write data to the disk, wherein the first bias signal causes the STO to protrude toward the disk. After the first interval, a second bias signal is applied to the STO during a second interval spanning at least part of the write operation, wherein an amplitude of the first bias signal is in the range of 1.1 to 1.5 times an amplitude of the second bias signal.

17 Claims, 5 Drawing Sheets

DATA STORAGE DEVICE PRE-BIASING A SPIN TORQUE OSCILLATOR PRIOR TO A WRITE OPERATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface. Since the quality of the write/read signal depends on the fly height of the head, conventional heads may also comprise an actuator for controlling the fly height. Any suitable fly height actuator (FHA) may be employed, such as a heater which controls fly height through thermal expansion, or a piezoelectric (PZT) actuator.

DETAILED DESCRIPTION

Figure 1:
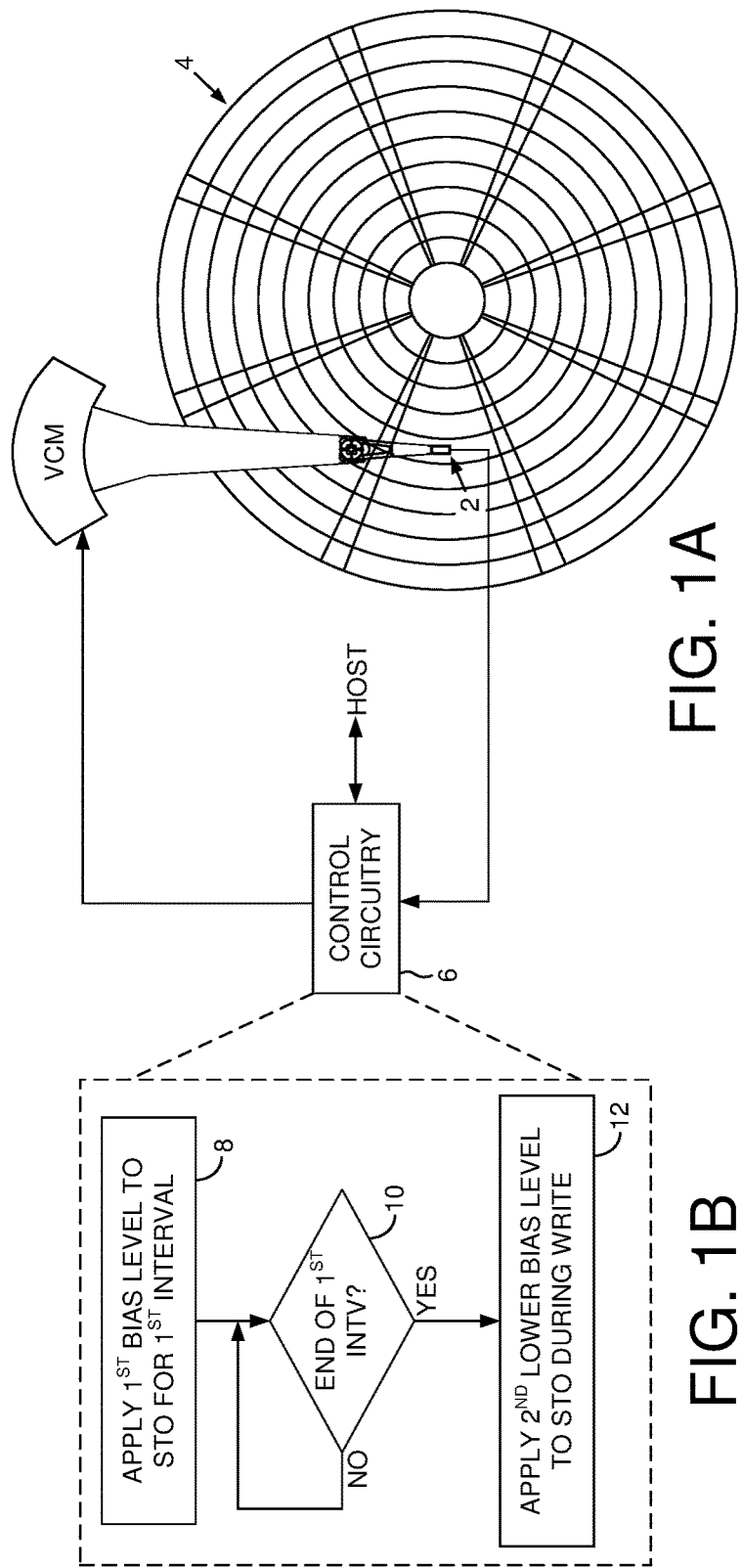
FIG. 1A shows a data storage device in the form of a disk drive comprising a head actuated over a disk, wherein the head comprises write components including a spin torque oscillator (STO).
FIG. 1B is a flow diagram according to an embodiment wherein prior to a write operation a first bias signal amplitude is applied to the STO during a first interval to cause the STO to protrude toward the disk, and during at least part of the write operation a second, lower bias signal amplitude is applied to the STO.

FIG. 1A shows a data storage device in the form of a disk drive according to an embodiment comprising a head 2 actuated over a disk 4, wherein the head comprises a spin torque oscillator (STO). The disk drive further comprises control circuitry 6 configured to execute the flow diagram of FIG. 1B, wherein a first bias signal is applied to the STO during a first interval preceding a write operation to write data to the disk, wherein the first bias signal causes the STO to protrude toward the disk (block 8). After the first interval (block 10), a second bias signal is applied to the STO during a second interval spanning at least part of the write operation (block 12), wherein an amplitude of the first bias signal is in the range of 1.1 to 1.5 times an amplitude of the second bias signal.

Figure 2:
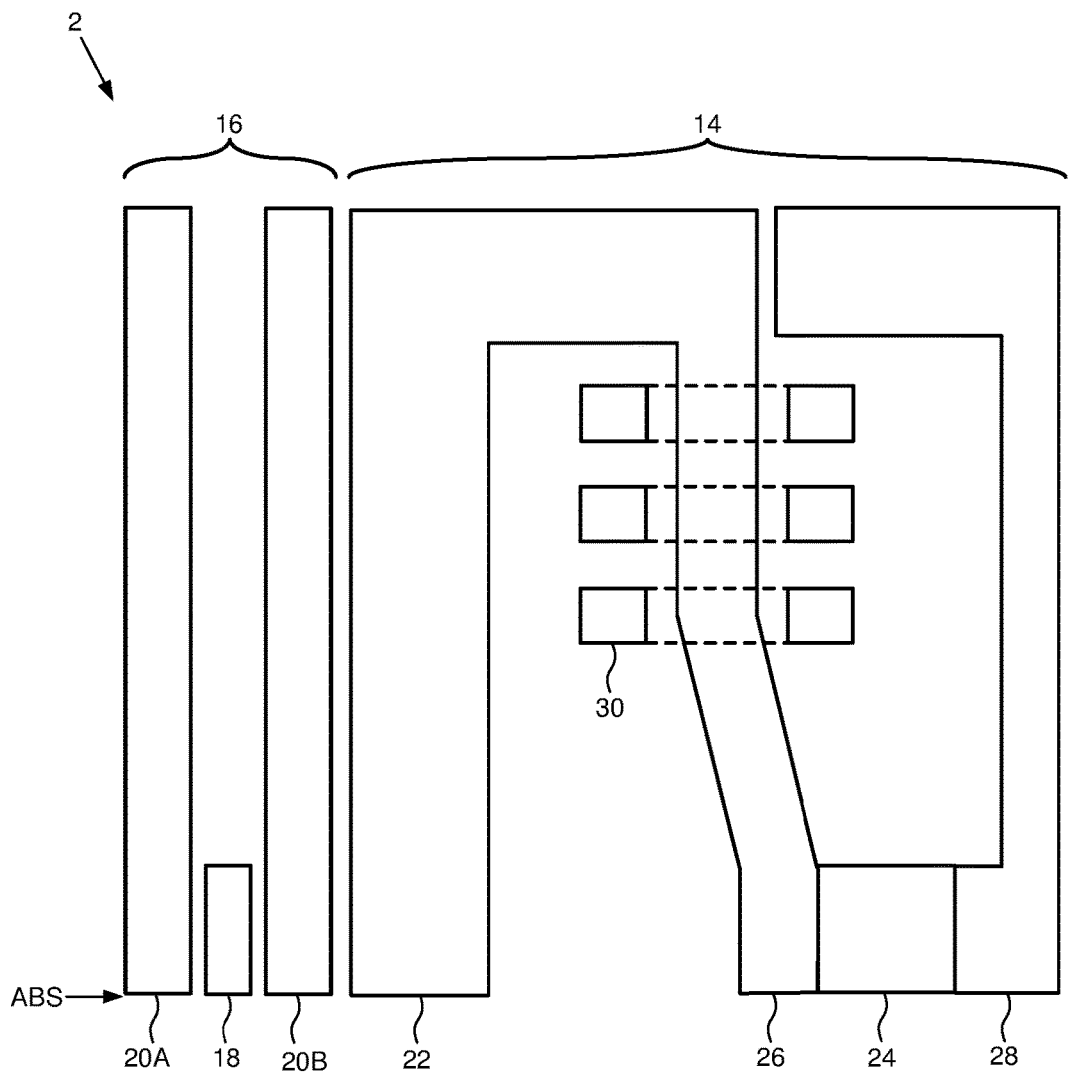
FIG. 2 shows a head according to an embodiment comprising an STO configured to apply a high frequency auxiliary magnetic field to the disk during a write operation.

FIG. 2 shows a cross-sectional view of an example head 2 that may be employed in the embodiments described herein, wherein the head 2 may comprise more or fewer components in various other embodiments, such as a suitable fly height actuator (not shown in FIG. 2) for adjusting the fly height of the head 2. In the embodiment of FIG. 2, the head 2 comprises write components 14 configured to write data to the disk 4, and read components 16 configured to read data from the disk 4. The bottom surface of the head 2 facing the disk 4 is referred to as an air bearing surface (ABS) wherein an air bearing forms between the head 2 and the disk 4 due to the disk 4 spinning such that the head 2 effectively flies above the disk 4. The read components 16 of the head 2 may comprise a magnetoresistive (MR) read element 18 that is fabricated between MR shields 20A and 20B. Other embodiments may employ a different read element, such as a suitable magnetic tunneling junction (MTJ) read element.

The write components 14 comprise a return pole 22, a STO 24 fabricated between a main pole 26 and a trailing shield 28, and a write coil 30 that excites the main pole 26 to generate a magnetic write field that magnetizes the surface of the disk 4, thereby writing data to the disk 4. As described in the embodiments below, the STO 24 protrudes toward the disk 4 when the STO bias signal is increased in connection with executing a write operation. In one embodiment, the amplitude of the STO bias signal is selected to achieve a desired auxiliary magnetic field near a resonant frequency of the magnetic grains, thereby enabling the magnetic field generated by the write coil 30 to more readily magnetize the disk surface. In addition, the amplitude of the STO bias signal is configured to achieve a target STO induced protrusion (SIP) of the STO 24 toward the disk 4.

In one embodiment, it may be desirable to reduce the amplitude of the STO bias during non-write modes so that the STO 24 avoids asperities on the disk as the disk spins past the head 2, and/or to increase the longevity of the STO 24 by avoiding thermal degradation. For example, during non-write modes the STO bias may be configured to a low level or turned off altogether. When the head approaches an area of the disk where a write operation is to occur, the STO 24 may be pre-biased by increasing the amplitude of the STO bias above the level used during the write operation so as to cause the STO 24 to quickly protrude toward the target SIP before the write operation begins. The STO bias may then be reduced to an amplitude that maintains the STO 24 at the target SIP during the write operation.

Figure 3A:
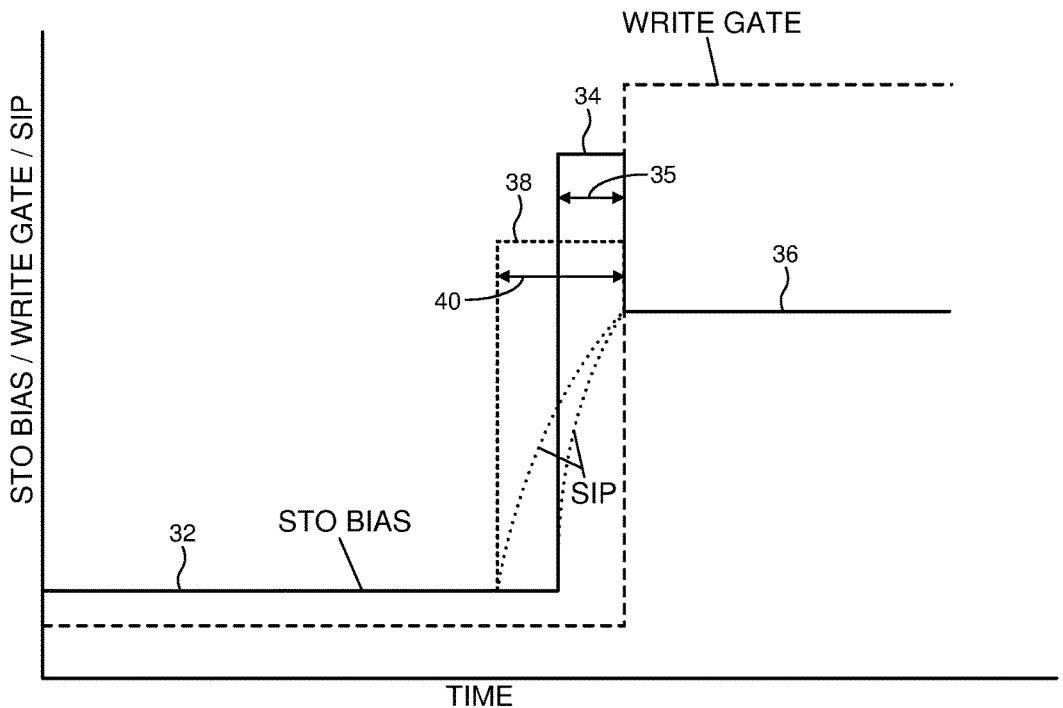
FIG. 3A shows an embodiment wherein the amplitude of the first bias signal is in the range of 1.1 to 1.5 times the amplitude of the second bias signal, and the first interval is in the range of 1.1 to 2 times a protrusion time constant of the STO.

An example of this embodiment is shown in FIG. 3A wherein prior to a write gate being asserted, the amplitude of STO bias may be increased from a low amplitude 32 to a first amplitude 34 during a first interval 35 preceding the write operation, thereby causing the SIP to quickly increase toward a target SIP. At the end of the first interval 35, the STO bias may be reduced to a second amplitude 36 for at least part of the write operation. In this embodiment, the second amplitude 36 for the STO bias maintains the STO 24 at the target SIP while the data is being written to the disk. In one embodiment, the first amplitude of the STO bias is limited to 1.5 times the second amplitude 36 in order to prevent damaging the STO 24. That is, in one embodiment applying an STO bias with an amplitude higher than 1.5 times the second amplitude 36 may damage the STO 24, for example, by overheating the STO 24 and/or the material (e.g., gold) that is used to adhere the STO 24 to the head 2. In one embodiment, the first amplitude 34 of the STO bias may be configured to a lower amplitude 38 while still achieving the target SIP by increasing the first interval 35 to interval 40, thereby reducing the peak stress on the STO 24. In one embodiment, the first amplitude of the STO bias may be configured to be in the range of 1.1 to 1.5 times the second amplitude 36, and the first interval for applying the first STO bias may be configured to be in the range of 1.1 to 2 times a protrusion time constant of the STO 24, where the protrusion time constant of the STO 24 corresponds to the time needed for the SIP to reach approximately 63.2% of its final value (the target SIP) when the STO bias is step increased from zero to the second amplitude 36.

In the embodiment of FIG. 3A, the STO 24 substantially reaches the target SIP at the end of the first interval just prior to asserting the write gate. However, in one embodiment it may be difficult to determine the first amplitude (e.g., amplitude 34) and/or the first interval (e.g., interval 35) that will cause the STO 24 to reach the SIP target just prior to asserting the write gate. For example, if the first amplitude 34 is too high and/or the first interval 35 too long, the STO 24 may overshoot the target SIP causing it to contact the disk. Alternatively, if the first amplitude 34 is too low and/or the first interval 35 is too short, the STO 24 may undershoot the target SIP causing poor write qualify at the beginning of the write operation due to an excessive gap between the STO 24 and the disk 4.

Figure 3B:
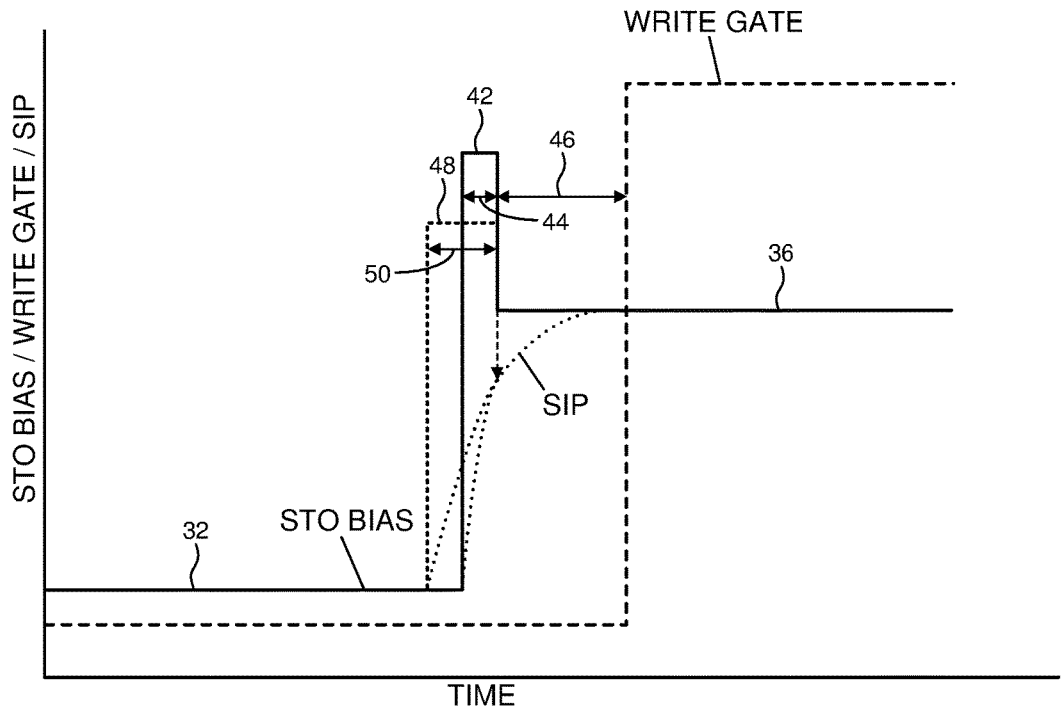
FIG. 3B shows an embodiment wherein the amplitude of the bias signal applied to the STO is reduced to the amplitude of the second bias signal a predetermined interval preceding the write operation to ensure the STO induced protrusion (SIP) reaches a target SIP prior to writing data to the disk.

FIG. 3B shows an embodiment which helps ensure the STO 24 substantially reaches the target SIP by the time the write gate is asserted. The amplitude of the STO bias is increased to a first amplitude 42 for a first interval 44, and then decreased to the second amplitude 36 for a predetermined interval 46 preceding the assertion of the write gate. During the first interval 42 the SIP increases quickly, and in one embodiment, reaches at least eighty percent of the target SIP by the end of the first interval. During interval 46 the SIP increases more gradually until substantially reaching the target SIP by the end of interval 46 (before the write gate is asserted). Similar to the embodiment of FIG. 3A, in the embodiment of FIG. 3B the first amplitude may be configured to a lower amplitude 48 and the first interval increased to interval 50 to achieve a similar outcome while reducing the peak stress on the STO 24.

Figure 3C:
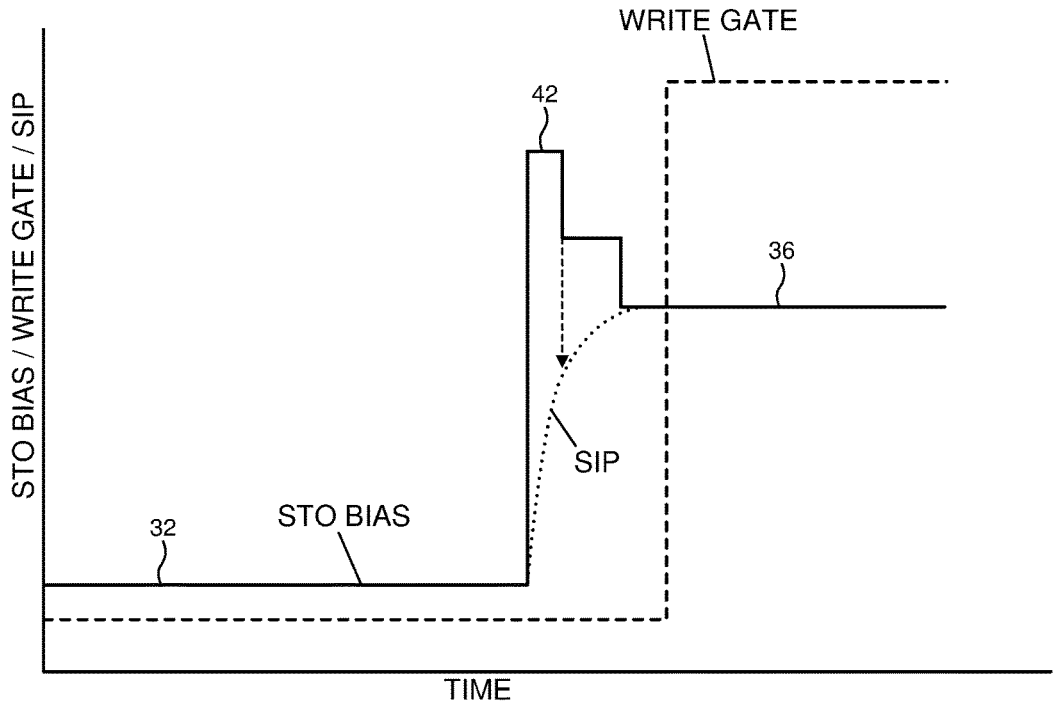
FIG. 3C shows an embodiment wherein the amplitude of the bias signal is stepped down to the amplitude of the second bias signal prior to writing data to the disk.
Figure 3D:
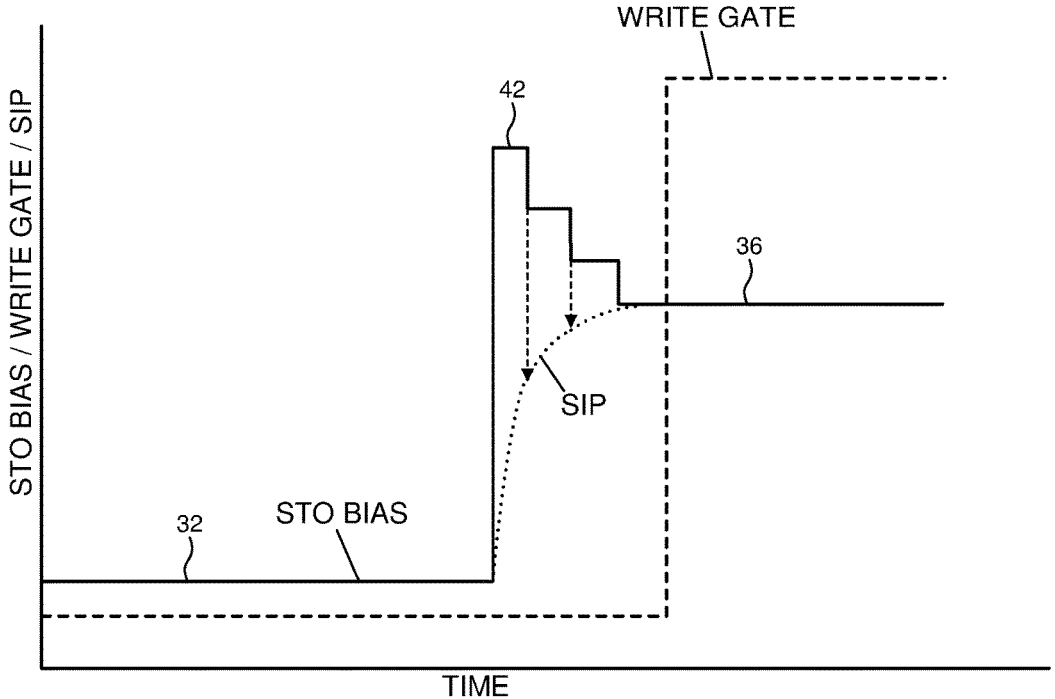
FIG. 3D shows an embodiment wherein the amplitude of the bias signal is stepped down multiple steps to the amplitude of the second bias signal prior to writing data to the disk.
Figure 3E:
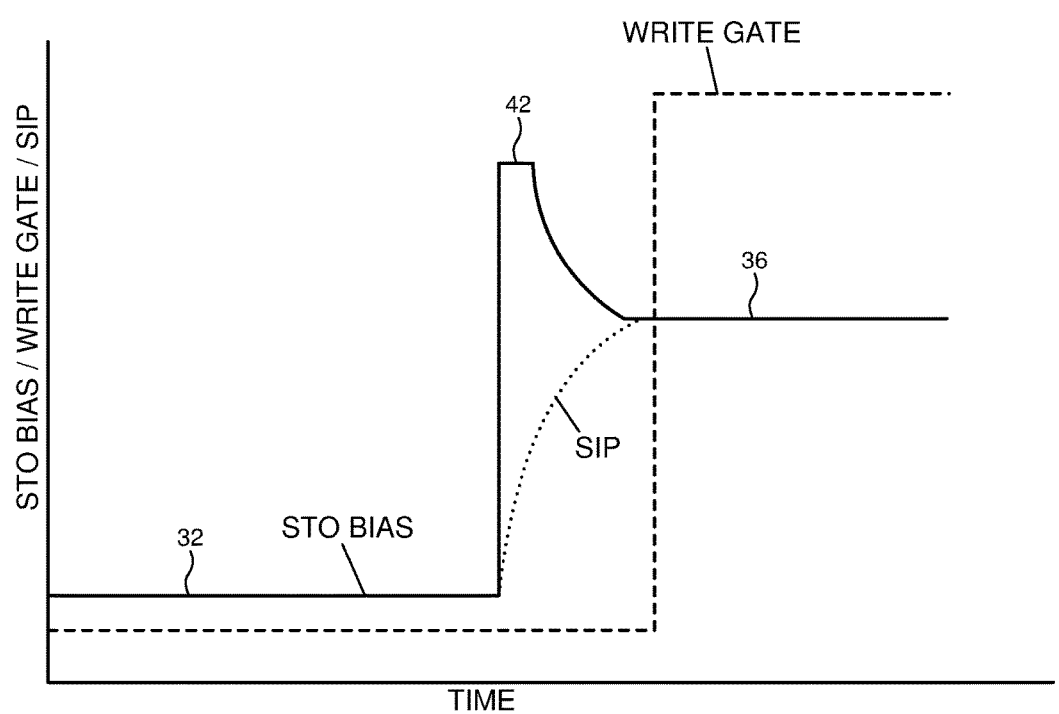
FIG. 3E shows an embodiment wherein the amplitude of the bias signal is reduced based on an exponential function to the amplitude of the second bias signal prior to writing data to the disk.

FIG. 3C shows an embodiment wherein the STO bias may be increased to a first amplitude 42 and then step decreased to the second amplitude 36 which may provide an improved SIP response toward the target SIP and/or allow the pre-bias interval to be decreased. FIG. 3D shows yet another embodiment wherein the STO bias may be stepped decreased by multiple steps toward the second amplitude 36, and FIG. 3E shows an embodiment wherein the STO bias may be decreased toward the second amplitude 36 based on an exponential decay. The exponential decay may be achieved in any suitable manner, such as using a digital function and digital-to-analog converter, or by discharging a capacitor in continuous time. In other embodiments, the STO bias may be reduced from the first amplitude 42 to the second amplitude 36 based on any other suitable function, such as a linear function.

Any suitable STO bias signal may be employed to bias the STO 24 in the embodiments described above, such as a suitable voltage signal or current signal. In addition, any suitable technique may be employed to configure the second amplitude 36 (the steady state amplitude) of the STO bias signal that achieves the target SIP. In one embodiment, the second amplitude 36 may be configured to a nominal amplitude determined by evaluating a subset of typical STOs as part of a manufacturing process. In another embodiment, the second amplitude 36 may be calibrated by the control circuitry 6 within each production disk drive, for example, by detecting the STO bias amplitude that causes the STO 24 to touchdown onto the disk 4, and then subtracting a suitable delta from the touchdown setting.

The STO bias signal may also be generated in any suitable manner, such as by generating a DC signal or an AC signal, or a combination of a DC and AC signal. In one embodiment, the STO bias signal may be generated as a pulse width modulated (PWM) signal wherein the amplitude of the STO bias signal may be adjusted by adjusting a duty cycle of the PWM signal. In this embodiment, the amplitude of the STO bias signal may be considered as the average amplitude of the PWM signal.

Although in the above described embodiments an STO is disclosed for generating a magnetic field to assist with the recording process, other embodiments may employ any suitable magnetic field generating write component used in field assisted magnetic recording such as MAMR. In addition, in some embodiments such as shown in FIG. 3B any suitable write component may be pre-biased prior to a write operation, including a fly height actuator, a laser used in HAMR, etc. In yet other embodiments, more than one write component may be pre-biased prior to a write operation, such as pre-biasing a fly height actuator and an energy assist component (e.g., a STO, a laser, etc.).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive or a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a spin torque oscillator (STO); and
   control circuitry configured to:
      apply a first bias signal to the STO during a first interval preceding a write operation to write data to the disk, wherein the first bias signal causes the STO to protrude toward the disk; and
      after the first interval, apply a second bias signal to the STO during a second interval spanning at least part of the write operation, wherein an amplitude of the first bias signal is in the range of 1.1 to 1.5 times an amplitude of the second bias signal.

2. The data storage device as recited in claim 1, wherein the first interval is in the range of 1.1 to 2 times a protrusion time constant of the STO.

3. The data storage device as recited in claim 1, wherein limiting the amplitude of the first bias signal to 1.5 times the amplitude of the second bias signal prevents damaging the STO.

4. The data storage device as recited in claim 1, wherein the second interval is substantially contiguous with the first interval.

5. The data storage device as recited in claim 4, wherein a first part of the second interval precedes the write operation.

6. The data storage device as recited in claim 5, wherein the STO substantially reaches a target protrusion by the end of the first part of the second interval.

7. The data storage device as recited in claim 5, wherein:
   the STO reaches at least eighty percent of a target protrusion by the end of the first interval; and
   the STO substantially reaches the target protrusion by the end of the first part of the second interval.

8. A data storage device comprising:
   a disk;
   a head actuated over the disk, wherein the head comprises a write component; and
   control circuitry configured to:
      apply a first bias signal to the write component during a first interval preceding a write operation to write data to the disk, wherein the first bias signal causes at least part of the head to protrude toward the disk;
      after the first interval, apply a second bias signal to the write component during a second interval preceding the write operation, wherein an amplitude of the second bias signal is less than an amplitude of the first bias signal; and
      after the second interval, apply the second bias signal to the write component for at least part of the write operation.

9. The data storage device as recited in claim 8, wherein the write component comprises a spin torque oscillator (STO).

10. The data storage device as recited in claim 8, wherein the write component comprises a laser.

11. The data storage device as recited in claim 8, wherein the at least part of the head substantially reaches a target protrusion by the end of the second interval.

12. The data storage device as recited in claim 8, wherein:
   the at least part of the head reaches at least eighty percent of a target protrusion by the end of the first interval; and
   the at least part of the head substantially reaches the target protrusion by the end of the second interval.

13. Control circuitry comprising:
   a means for applying a first bias signal to a write component of a head during a first interval preceding a write operation to write data to a disk, wherein the first bias signal causes at least part of the head to protrude toward the disk;
   a means for applying a second bias signal to the write component during a second interval preceding the write operation and after the first interval, wherein an amplitude of the second bias signal is less than an amplitude of the first bias signal; and a means for applying the second bias signal to the write component after the second interval for at least part of the write operation.

14. The control circuitry as recited in claim 13, wherein the write component comprises a spin torque oscillator (STO).

15. The control circuitry as recited in claim 13, wherein the write component comprises a laser.

16. The control circuitry as recited in claim 13, wherein the at least part of the head substantially reaches a target protrusion by the end of the second interval.

17. The control circuitry as recited in claim 13, wherein:

the at least part of the head reaches at least eighty percent of a target protrusion by the end of the first interval; and the at least part of the head substantially reaches the target protrusion by the end of the second interval.

* * * * *